(12) United States Patent
Tako

(10) Patent No.: US 10,023,044 B2
(45) Date of Patent: Jul. 17, 2018

(54) SADDLE TYPE VEHICLE

(71) Applicant: HONDA MOTOR CO., LTD., Tokyo (JP)

(72) Inventor: Kenji Tako, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/262,520

(22) Filed: Sep. 12, 2016

(65) Prior Publication Data

US 2017/0087978 A1    Mar. 30, 2017

(30) Foreign Application Priority Data

Sep. 24, 2015 (JP) ................................ 2015-186794

(51) Int. Cl.
| | |
|---|---|
| *B60K 11/06* | (2006.01) |
| *B60K 11/08* | (2006.01) |
| *B62K 5/027* | (2013.01) |
| *B62K 5/05* | (2013.01) |
| *B62M 7/04* | (2006.01) |
| *B62K 5/08* | (2006.01) |
| *B62K 5/10* | (2013.01) |

(52) U.S. Cl.
CPC .............. *B60K 11/08* (2013.01); *B60K 11/06* (2013.01); *B62K 5/027* (2013.01); *B62K 5/05* (2013.01); *B62K 5/08* (2013.01); *B62K 5/10* (2013.01); *B62M 7/04* (2013.01); *B62K 2204/00* (2013.01)

(58) Field of Classification Search
CPC ........ B60K 11/06; B60K 11/08; B62K 5/027; B62K 5/05; B62K 5/08; B62K 5/10; B62K 2204/00; B62M 7/04

USPC .................................... 180/68.1, 68.2, 68.4
See application file for complete search history.

(56) References Cited

U.S. PATENT DOCUMENTS

| | | | | |
|---|---|---|---|---|
| 4,457,552 | A |  | 7/1984 | Katsuoka |
| 8,056,613 | B2 | * | 11/2011 | Frijas ....................... F01P 11/10 |
| | | | | 123/198 E |
| 8,141,670 | B2 | * | 3/2012 | Hayashi ................. B60K 11/04 |
| | | | | 180/68.4 |
| 9,493,067 | B2 | * | 11/2016 | Kawai .................... B62K 11/04 |
| 2016/0347199 | A1 | * | 12/2016 | Mochizuki .......... B60L 11/1877 |

FOREIGN PATENT DOCUMENTS

| | | | | |
|---|---|---|---|---|
| JP | 58-8477 | A |  | 1/1983 |
| JP | 5-26774 | U |  | 4/1993 |
| JP | 11-129958 | A |  | 5/1999 |
| JP | 2008080986 | A |  | 4/2008 |
| JP | 2011016415 | A | * | 1/2011 |
| JP | 2011016415 | A | * | 1/2011 |

* cited by examiner

*Primary Examiner* — John Daniel Walters
(74) *Attorney, Agent, or Firm* — Birch, Stewart, Kolasch & Birch, LLP

(57) ABSTRACT

A saddle type vehicle wherein an engine and an electrical component can be cooled with a high efficiency by cooling air. An electrical component case which accommodates an electrical component therein is provided in front of an engine and functions as a rectification member provided integrally with the electrical component to shunt and guide the flow of air to the engine and the electrical component. Further, the saddle type vehicle includes a rectification unit provided separately from the electrical component and functioning as a different rectification member for guiding the flow of air to the engine.

17 Claims, 12 Drawing Sheets

SADDLE TYPE VEHICLE

CROSS-REFERENCE TO RELATED APPLICATIONS

The present application claims priority under 35 USC 119 to Japanese Patent Application No. 2015-186794 filed Sep. 24, 2015 the entire contents of which are hereby incorporated by reference.

BACKGROUND OF THE INVENTION

1. Field of the Invention

The present invention relates to a saddle type vehicle including an engine and an electrical component.

2. Description of Background Art

A configuration of a saddle type vehicle such as a motorcycle is known wherein an electrical component is disposed in an engine cover and an air inlet and an air outlet for a flow of air are provided forwardly or rearwardly of the electrical component of the engine cover. See, for example, Japanese Patent Laid-Open No. 1999-129958.

Incidentally, there is a limit to the amount of the flow of air capable of being fetched into the engine cover and there is the possibility that the cooling performance may degrade. Therefore, in order to cool an electrical component utilizing the flow of air positively, it seems recommendable to dispose the electrical component at a front location of a vehicle as far as possible.

However, if a cooled member which requires cooling such as an engine is positioned in the rear of the electrical component, then there is the possibility that the electrical component may disturb a flow of air to the cooled member.

SUMMARY AND OBJECTS OF THE INVENTION

Therefore, it is an object of an embodiment of the present invention to provide a saddle type vehicle wherein an engine and an electrical component can be cooled with a high efficiency by cooling air.

In order to solve the problems described above, according to an embodiment of the present invention, there is provided a saddle type vehicle including an engine (15), and an electrical component, the electrical component being provided in front of the engine (15), a rectification member (61) being provided integrally with the electrical component to shunt and guide the flow of air to the engine (15) and the electrical component.

According to an embodiment of the present invention, the saddle type vehicle may be configured such that the rectification member (61) includes rectifying plates (62M, 63M, 64M) directed to the engine (15) and the electrical component. Further, the saddle type vehicle may be configured such that it further includes a pair of left and right front wheels (12), and that the rectification member (61) is provided at the inner side of the pair of left and right front wheels (12) as viewed in front elevation of a vehicle body.

According to an embodiment of the present invention, the saddle type vehicle may be configured such that it further includes a different rectification member (71) provided separately from the electrical component and configured to guide the flow of air to the engine (15). The different rectification member (71) integrally includes an electrical component attachment portion (73) to which the electrical component is attached and a positioning unit (74) positioned on the engine (15), and is disposed such that an air passing space (73K) is provided between the electrical component and the engine (15).

According to an embodiment of the present invention, the saddle type vehicle may be configured such that the positioning unit (74) has a rectifier (74A) extending in a forward and rearward direction of the vehicle body between the positioning unit (74) and the electrical component attachment portion (73). Further, the saddle type vehicle may be configured such that the rectifier (74A) may be formed in a projected shape projecting to the outer side in a vehicle widthwise direction with respect to the engine (15).

According to an embodiment of the present invention, the saddle type vehicle may be configured such that a plurality of rectifiers (74A) are provided and an opening portion (74K) directed to the engine (15) is provided between the plurality of rectifiers (74A). Further, the saddle type vehicle may be configured such that the engine (15) is a multi-cylinder engine including a plurality of cylinders spaced from each other in the forward and rearward direction of the vehicle body, and the rectifier (74A) is provided over the front to the rear of the engine (15).

According to an embodiment of the present invention, the saddle type vehicle may be configured such that the different rectification member (71) includes a front-rear opening portion (S1) open in the forward and rearward direction between the different rectification member (71) and the rectification member (61) such that the flow of air passing the front-rear opening portion (S1) is contacted with the engine (15).

According to an embodiment of the present invention, since the electrical component is provided in front of the engine and the rectification member configured to shunt and guide the flow of air to the engine and the electrical component is provided integrally with the electrical component, the engine and the electrical component can be cooled with a high efficiency by cooling air. In addition, the space in front of the engine can be effectively utilized.

According to an embodiment of the present invention, since the rectification member has the rectifying plate directed to the engine and the electrical component, a flow of air can be guided precisely to the engine and the electrical component by the rectifying plate.

According to an embodiment of the present invention, since the pair of left and right front wheels are provided and the rectification member is provided on the inner side of the pair of left and right front wheels as viewed in a front elevational view of the vehicle body, the engine and the electrical component can be cooled with a high efficiency utilizing the flow of air that is not blocked by the front wheels.

According to an embodiment of the present invention, the different rectification member which is a different member from the electrical component and guides the flow of air to the engine is provided, and the different rectification member integrally includes the electrical component attachment portion to which the electrical component is attached and the positioning unit positioned on the engine and the different rectification member is disposed such that the air passing space is provided between the electrical component and the engine. Therefore, the positioning accuracy between the electrical component and the engine is secured and an expected cooling effect is likely to be obtained. In addition, heat transmission between the engine and the electrical component can be suppressed effectively.

According to an embodiment of the present invention, since the positioning unit has the rectifier extending in the forward and rearward direction of the vehicle body between the positioning unit and the electrical component attachment portion, a flow of air is adjusted to the forward and rearward direction of the vehicle body, which is advantageous in enhancement of the rectilinearly advancing performance of the vehicle. Further, since the rectifier is formed in a projected shape projecting to the outer side in the vehicle widthwise direction with respect to the engine, the strength of the rectifier can be enhanced with a high efficiency and the rectifier can be used also as an engine guard.

According to an embodiment of the present invention, since the plurality of rectifiers are provided and the opening portion directed to the engine is provided between the plurality of rectifiers, the flow of air can be introduced to the engine side through the opening portion and the cooling effect of the engine is likely to be enhanced.

According to an embodiment of the present invention, since the engine is a multi-cylinder engine including a plurality of cylinders spaced from each other in the forward and rearward direction of the vehicle body and the rectifier is provided over the front and rear of the engine, the rectifier can be provided long utilizing the length in the forward and rearward direction of the engine which is elongated in the forward and rearward direction. Accordingly, the rectification effect, engine protection effect and engine cooling effect by the rectifier are likely to be enhanced.

According to an embodiment of the present invention, since the different rectification member includes the front-rear opening portion open in the forward and rearward direction between the different rectification member and the rectification member such that the flow of air passing the front-rear opening portion is contacted with the engine. Therefore, the cooling effect for the engine can be improved further.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 11(A) and 11(B) are views depicting the battery case and a cooling fan, wherein FIG. 11(A) is a side elevational view and FIG. 11(B) is a top plan view.

DETAILED DESCRIPTION OF THE PREFERRED EMBODIMENTS

In the following, an embodiment of the present invention is described with reference to the drawings. It is to be noted that, in the following description, unless otherwise specified, directions such as forward, rearward, leftward, rightward, upward and downward directions are the same as those with regard to a vehicle body. Further, in the figures, FR denotes a forward direction of the vehicle body; UP denotes an upward direction of the vehicle body; and LH denotes a leftward direction of the vehicle body.

Figure 1:
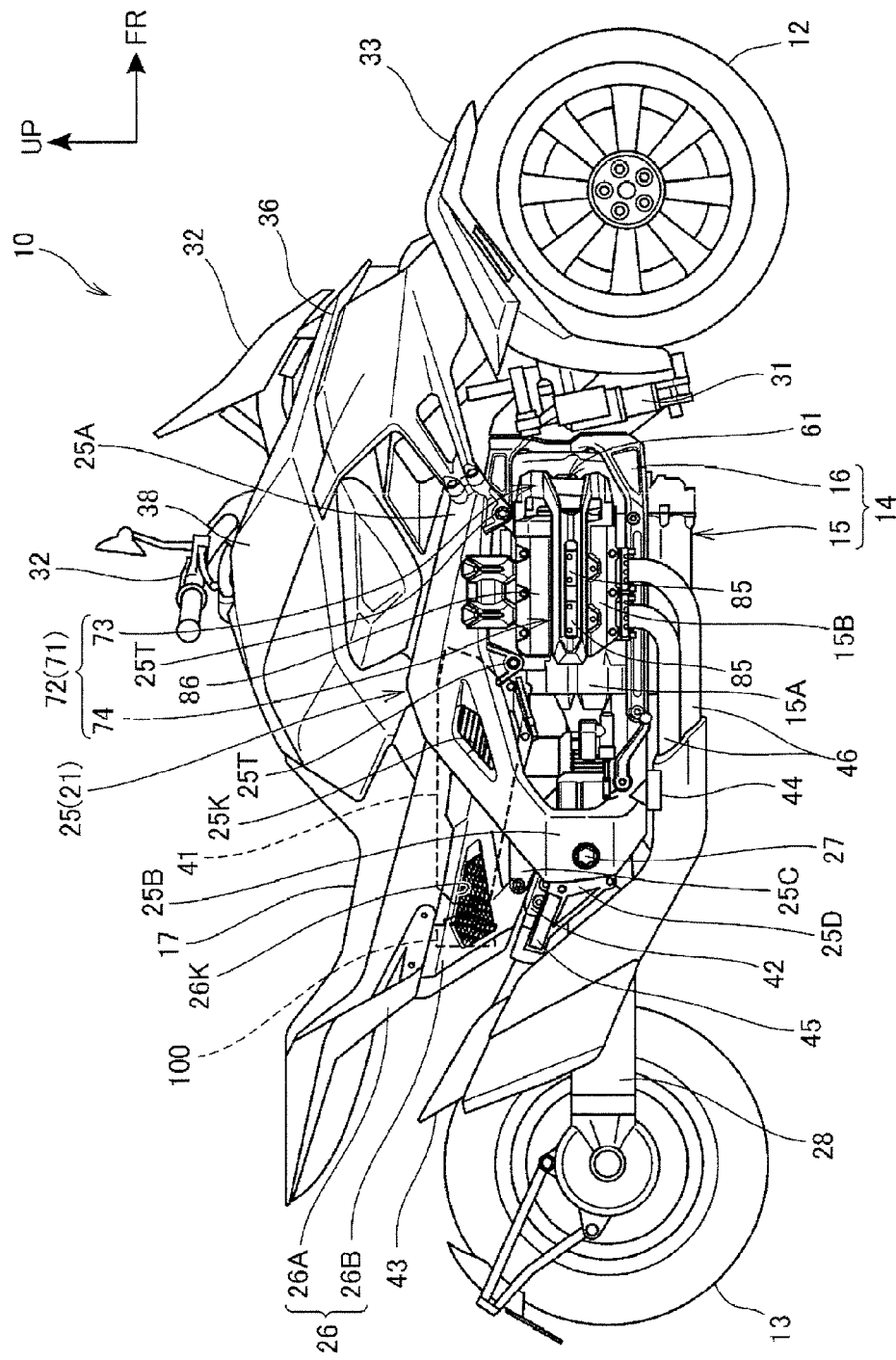
FIG. 1 is a right side elevational view of a saddle type vehicle according to an embodiment of the present invention.
Figure 2:
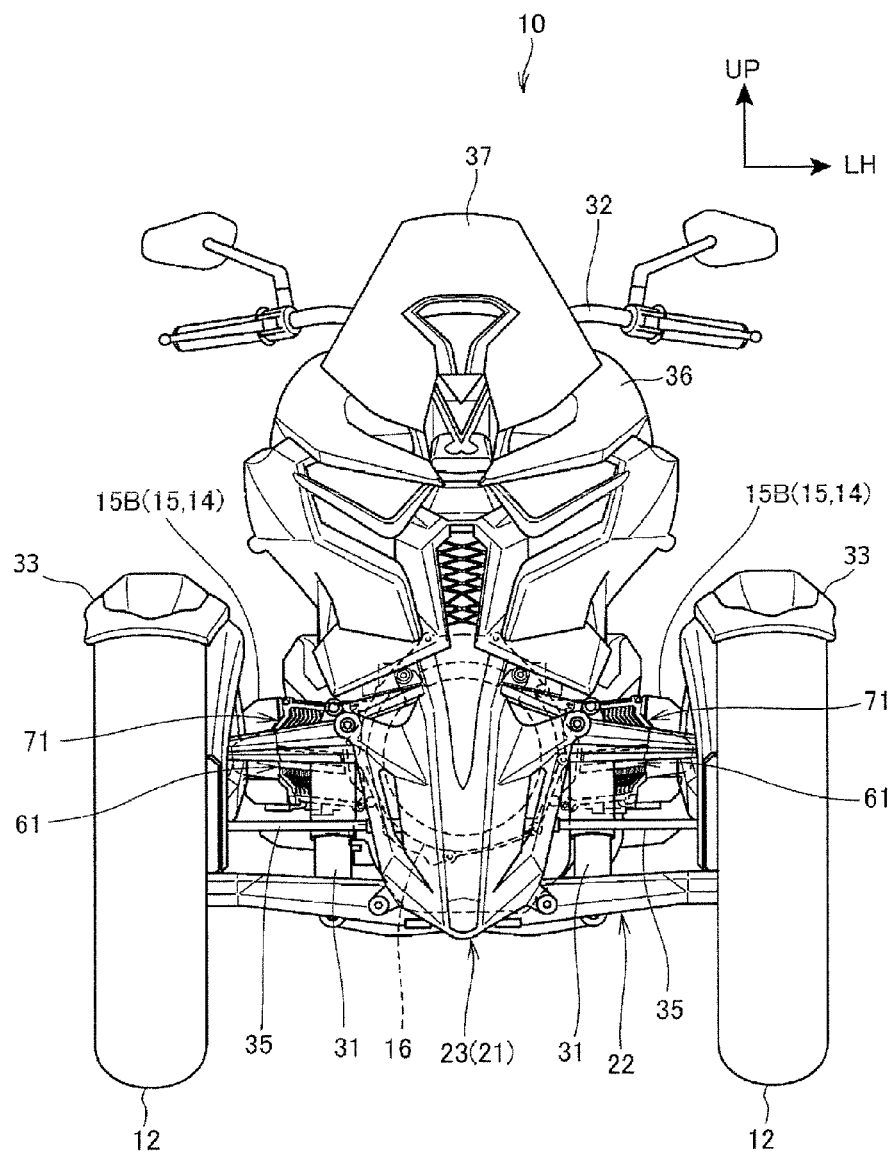
FIG. 2 is a front elevational view of the saddle type vehicle.

FIG. 1 is a right side elevational view of a saddle type vehicle according to the embodiment of the present invention; FIG. 2 is a front elevational view; and FIG. 3 is a bottom plan view.

Figure 3:
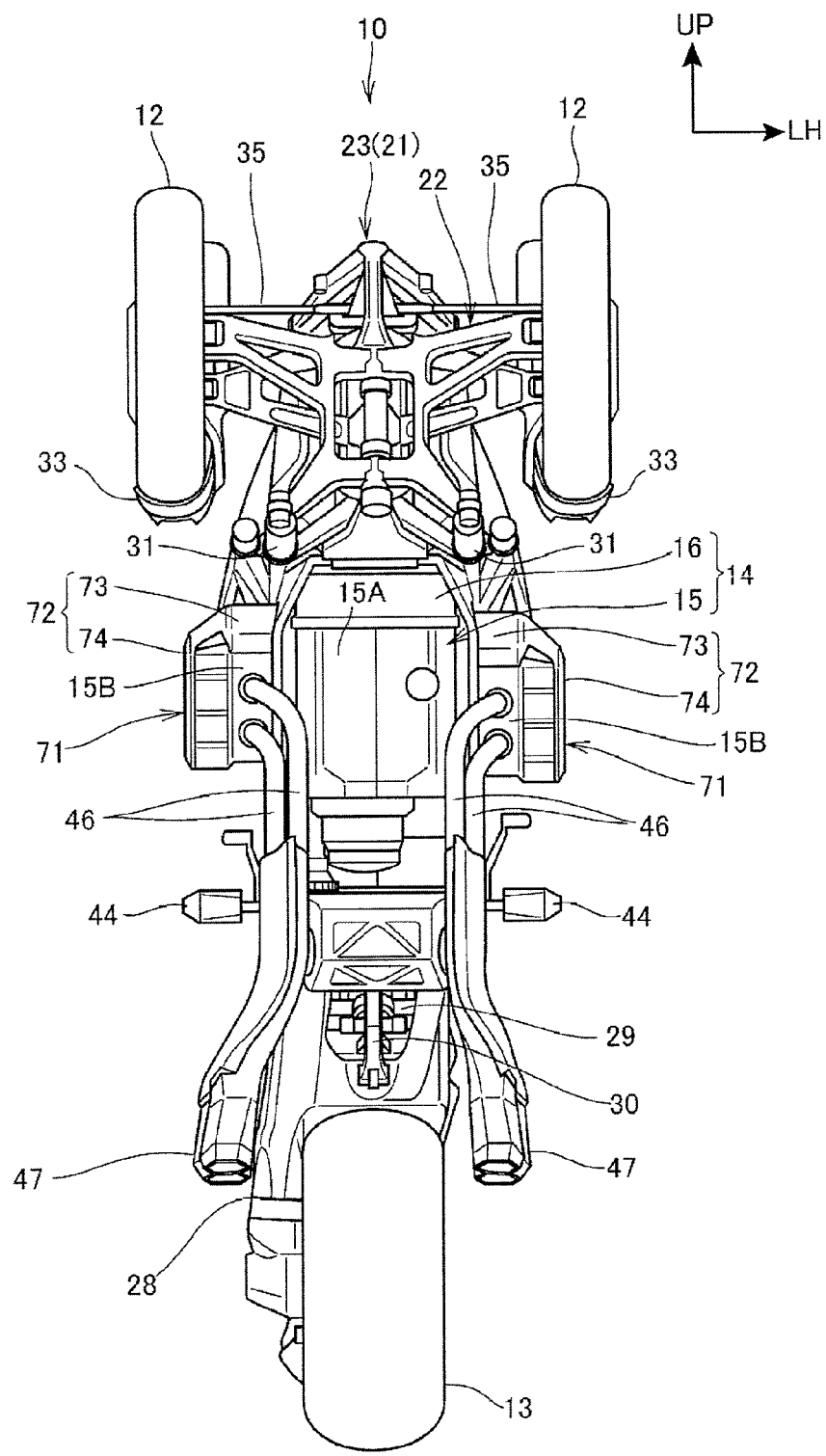
FIG. 3 is a bottom plan view of the saddle type vehicle.

As depicted in FIGS. 1 to 3, a saddle type vehicle 10 is a three-wheeled vehicle including a pair of left and right front wheels 12 and a single rear wheel 13 and is a swing-type vehicle wherein a vehicle body is swingable to the left and right with respect to the pair of left and right front wheels 12. Further, the saddle type vehicle 10 includes a power unit 14 which in turn includes an engine 15 and a motor 16 (vehicle body driving motor). In short, the saddle type vehicle 10 is configured as a hybrid vehicle.

A vehicle body frame 21 includes a front frame unit 23 (FIG. 2), a main frame unit 25 (FIG. 1) and a seat rail unit 26 (FIG. 1). The front frame unit 23 supports the pair of left and right front wheels 12 for upward and downward swinging motion through a pair of upper and lower arm portions 22 (FIG. 2). The main frame unit 25 supports the power unit 14 at the rear of the front wheels 12 in front of the rear wheel 13. The seat rail unit 26 is connected to the main frame unit 25 and supports a seat 17 (occupants' seat) thereon. It is to be noted that reference numeral 31 depicted in FIG. 2 and so forth denotes a pair of left and right front shock absorbers. Each front shock absorbers unit 31 includes a shock absorber configured from a damper and a compression coil spring.

The pair of left and right front wheels 12 are steered to the left or the right in response to a steering operation of a handlebar 32 provided at a front upper portion of the vehicle body. The left and right front wheels 12 are covered with front fenders 33 over a range from above to the rear thereof. In FIGS. 2 and 3 a tie rod 35 is a part of a steering mechanism for steering the front wheels 12. A front cowl 36 covers a front side of the vehicle body, and a windshield 37 is attached to the front cowl 36.

The main frame unit 25 integrally includes a pair of left and right main frame main portions 25A (FIG. 1) extending in the forward and rearward direction of the vehicle body and a pair of left and right pivot frame portions 25B (FIG.

1) extending downwardly from the rear of the main frame main portions 25A. The left and right main frame main portions 25A and pivot frame portions 25B are formed as a large size frame of a non-circular cross sectional shape (for example, a substantially elliptical cross sectional shape or rectangular cross sectional shape) elongated in a direction along a vertical plane with respect to a center axial line which passes the center of the frame portions 25A and pivot frame portions 25B. Further, the left and right main frame main portions 25A and 25B are formed as a frame which suppresses the projection to the outer sides in the vehicle widthwise direction.

As depicted in FIG. 2, a plurality of (four) engine hangers 14H (FIG. 4) are provided on the upper face of the power unit 14 in a spaced relationship from each other in the forward and rearward direction and the leftward and rightward direction. The engine hangers 14H are fixed to a plurality of brackets 25T (FIG. 1) provided on the main frame unit 25 by fastening members such as bolts. Consequently, the power unit 14 is supported in a space below the pair of left and right main frame main portions 25A in front of the pair of left and right pivot frame portions 25B.

Between the pair of left and right main frame main portions 25A above a front portion of the power unit 14, an air cleaner (not depicted) is disposed, and a fuel tank (not depicted) for storing fuel to be supplied to the engine 15 is disposed on the air cleaner. The air cleaner and the fuel tank are covered with a vehicle body cover 38 and are not visually observed from the outside of the vehicle body. The seat 17 is disposed in the rear of the fuel tank and is configured as a saddle type seat to be seated astride by two occupants (a rider and a passenger).

Between rear portions of the left and right main frame main portions 25A above the rear of the power unit 14, a battery case 41 (FIG. 1) for accommodating therein a battery for driving the motor is disposed.

The pivot frame portions 25B support a front end of a swing arm 28 for pivotal motion thereon through a pivot shaft 27. The swing arm 28 extends rearwardly and supports the rear wheel 13 for rotation at a rear end thereof. Consequently, the swing arm 28 is supported for upward and downward swing motion and supports the rear wheel 13 for upward and downward movement.

Figure 9:
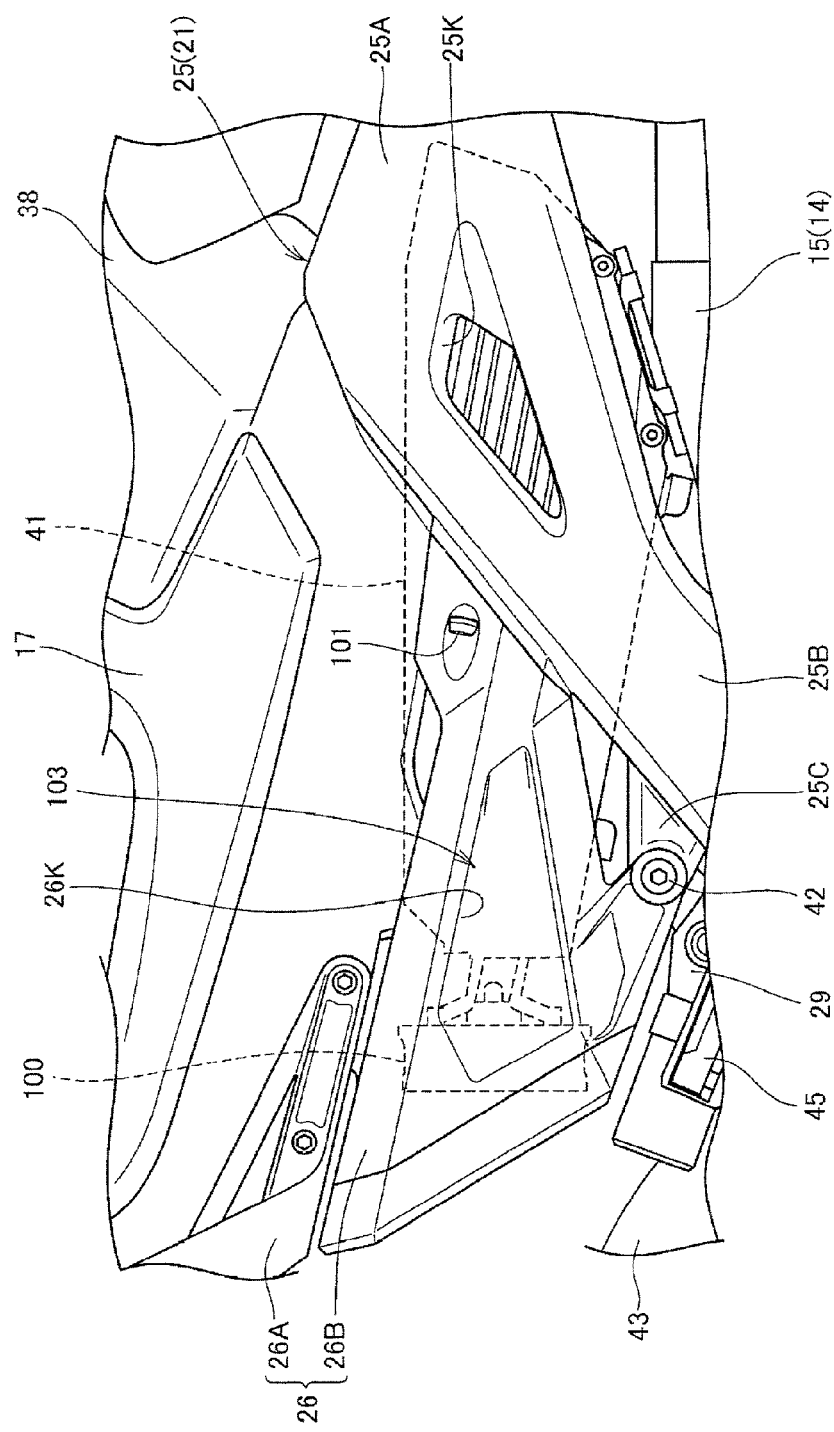
FIG. 9 is a view of a battery case as viewed from the right side together with peripheral components.

A single rear shock absorber 29 (FIG. 3) is interposed between the swing arm 28 and the main frame unit 25. As depicted in FIG. 3, the rear shock absorber 29 is connected at a lower portion thereof to the swing arm 28 through a link mechanism 30 (FIG. 3). Further, as depicted in FIG. 1 and FIG. 9, the rear shock absorber 29 is supported at an upper portion thereof a shaft part 42 (in the present configuration, a long axis bolt) which bridges brackets 25C (FIG. 1 and FIG. 9 hereinafter described) extending rearwardly from the pair of left and right pivot frame portions 25B.

It is to be noted that the rear shock absorber 29 is a unit which integrally includes a damper and a shock absorber configured from a compression coil spring. Further, a rear fender 43 is attached to the swing arm 28 and covers a front upper portion of the rear wheel 13.

To a lower portion of the pivot frame portions 25B, a pair of left and right main steps 44 (FIG. 1 and FIG. 2) on which an occupant (rider) seated at a front portion of the seat 17 places his/her feet and a pair of left and right pillion steps 45 (FIG. 1) on which another occupant (passenger) seated at a rear portion of the seat 17 places his/her feet are attached. The main steps 44 are provided in the proximity of a lower portion of the pivot frame portions 25B. Meanwhile, the pillion steps 45 are attached for accommodation to brackets 25D (FIG. 1 and FIG. 10 hereinafter described) which extend rearwardly from a lower portion of the pivot frame portions 25B.

The power unit 14 is a unit which integrally includes the engine 15 and the motor 16. As depicted in FIGS. 1 to 3, the engine 15 is a horizontally-opposed four-cylinder engine and has a crankcase portion 15A provided centrally in the vehicle widthwise direction for accommodating a crankshaft therein. The engine 15 further has, on the left and right sides of the crankcase portion 15A, cylinder portions 15B which have formed therein a cylinder chamber in which a piston connected to the crankshaft slidably moves.

Each of the left and right cylinder portions 15B has two cylinders provided in a spaced relationship from each other in the forward and rearward direction therein and extends to a position at which it overlaps with the pair of left and right front wheels 12 (FIGS. 2 and 3) as viewed in a front elevational view (FIG. 2). Two exhaust pipes 46 extend downwardly from each of the pair of left and right cylinder portions 15B and are bent so as to extend rearwardly, and an exhaust muffler 47 is connected to ends thereof.

The motor 16 is attached to a front face of the crankcase portion 15A of the engine 15 and functions as a vehicle body driving motor for driving the crankshaft to rotate. A transmission mechanism for transmitting rotation of the crankshaft with the speed thereof changed is accommodated in a rear portion of the crankcase portion 15A, and output power of the power unit 14 is transmitted to the rear wheel 13 through the transmission mechanism and a drive shaft (not depicted) disposed in the swing arm 28 or the like.

The disposition of electrical components of the saddle type vehicle 10 and a structure for cooling the electrical components are described hereinafter.

In the saddle type vehicle 10, electrical components whose heat generation amount is comparatively great are accommodated in an electrical component case 61 and provided in front of the engine 15 such that the flow of air from the front side of the vehicle body is shunted and introduced to the engine 15 and the electrical components by the electrical component case 61. The electrical component case 61 is supported in front of the engine 15 through a rectification unit 71 separate from the electrical component case 61 such that the flow of air from the front side of the vehicle body is introduced to the engine 15 by the rectification unit 71. Both of the electrical component case 61 and the rectification unit 71 function as a rectification member for introducing a flow of air from the front side of the vehicle body to the engine 15 and so forth. Throughout the following description the terms rectifier, rectification member and rectifying plates refer to a structure for shunting, adjusting and guiding the flow of air in the forward and rearward direction of the vehicle body for cooling the electrical components positioned within the electrical component case 61 of the engine 15.

The electrical components accommodated in the electrical component case 61 are not provided in a vehicle which does not include a vehicle body driving motor, and electrical components of a hybrid vehicle are applied as the electrical components. For example, the electrical components may include a power conversion unit for converting electric power of a battery in the battery case 41 into driving power of the motor 16, a control unit for controlling driving of the motor 16, regeneration into electric energy and so forth, or a power drive unit (PDU) including such power conversion unit and control unit, and so forth.

Since the electrical components of the type described are parts which generate a great amount of heat and have a comparatively large size, they require cooling. In addition, these parts require a wide space for being position on the vehicle. In the present embodiment, electronic parts configuring the electrical components are accommodated in allocation in two electrical component cases 61 of the same shape. One of the electrical component cases 61 is provided in front of one of the left and right cylinder portions 15B while the other electrical component case 61 is provided in front of the other cylinder portion 15B.

By providing the electrical components in front of the engine 15, the electrical components can be disposed making use of a space existing between the engine 15 and the front wheels 12 positioned in front of the engine 15. Accordingly, the disposition space for the electrical components can be assured readily in comparison with that in an alternative case in which the disposition space for the electrical components is provided in the vehicle body cover 38.

In addition, since the engine 15 is exposed to the outside, in comparison with a four-wheeled vehicle or the like in which an engine of the type described is accommodated in a vehicle body, air flowing from the front side toward the engine 15 can be contacted efficiently with the electrical components in front of the engine 15 and the electrical components can be readily cooled. Since also the motor 16 is disposed forwardly of the engine 15, also the disposition space for the motor 16 which is a large-size part can be assured readily and can be readily cooled by the flow of air.

Figure 4:
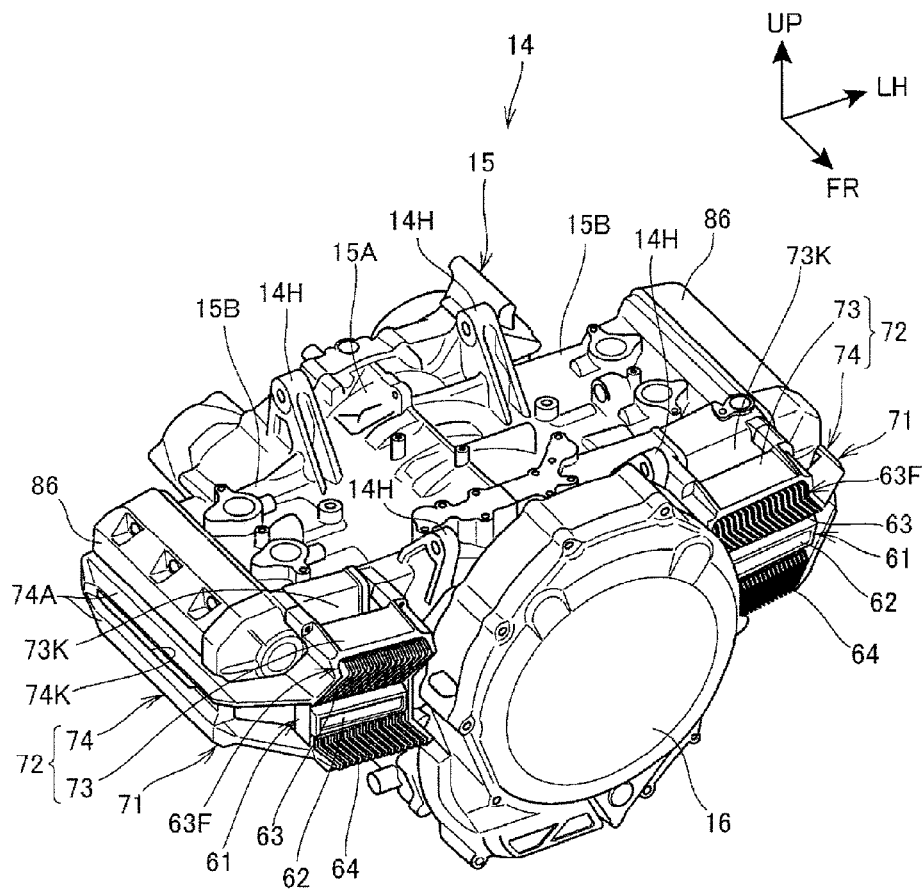
FIG. 4 is a view depicting a power unit together with peripheral components.

FIG. 4 is a view depicting the power unit 14 together with peripheral components. As depicted in FIG. 4, the left and right electrical component cases 61 and the left and right rectification units 71 provided in the power unit 14 are formed in a leftwardly and rightwardly symmetrical shape with reference to the center in the widthwise direction of the engine 15. In the following description, the electrical component case 61 and the rectification unit 71 on the right side are described together with a peripheral structure while an overlapping description of those on the left side is omitted.

Figure 5:
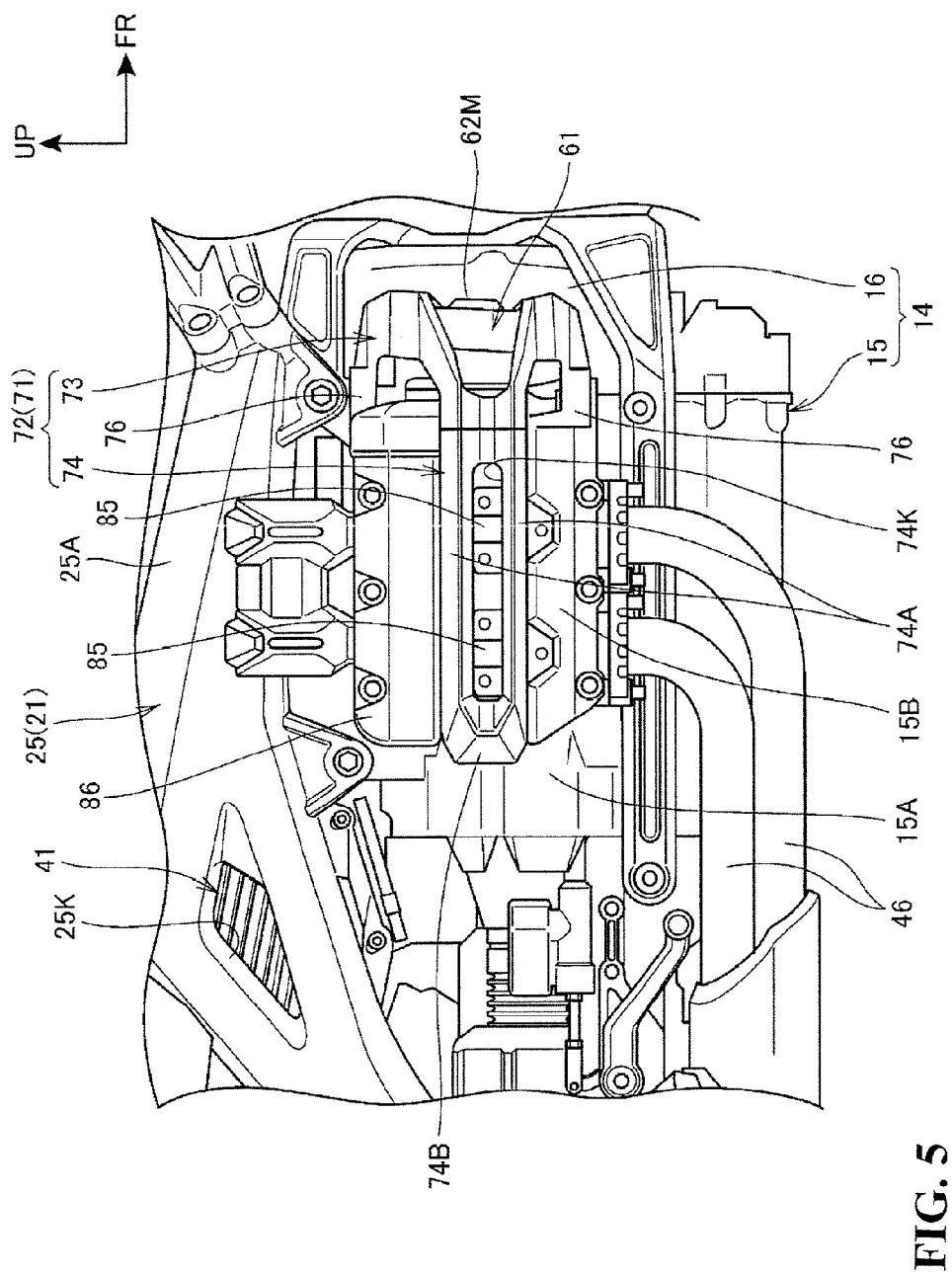
FIG. 5 is a view of a right side electrical component case as viewed from the right side together with a peripheral structure.
Figure 6:
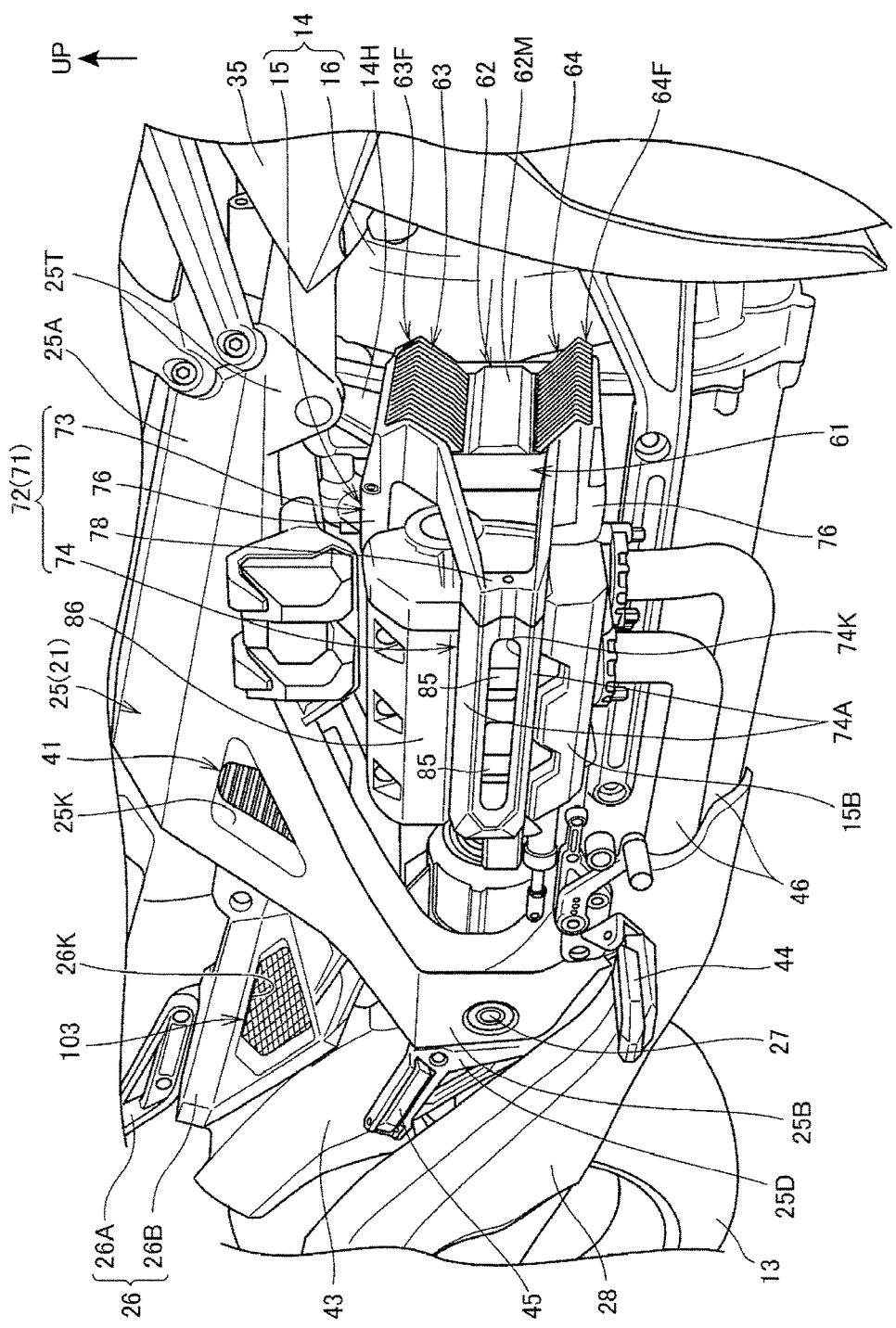
FIG. 6 is a view of the right side electrical component case as viewed from the right front side together with a peripheral structure.
Figure 7:
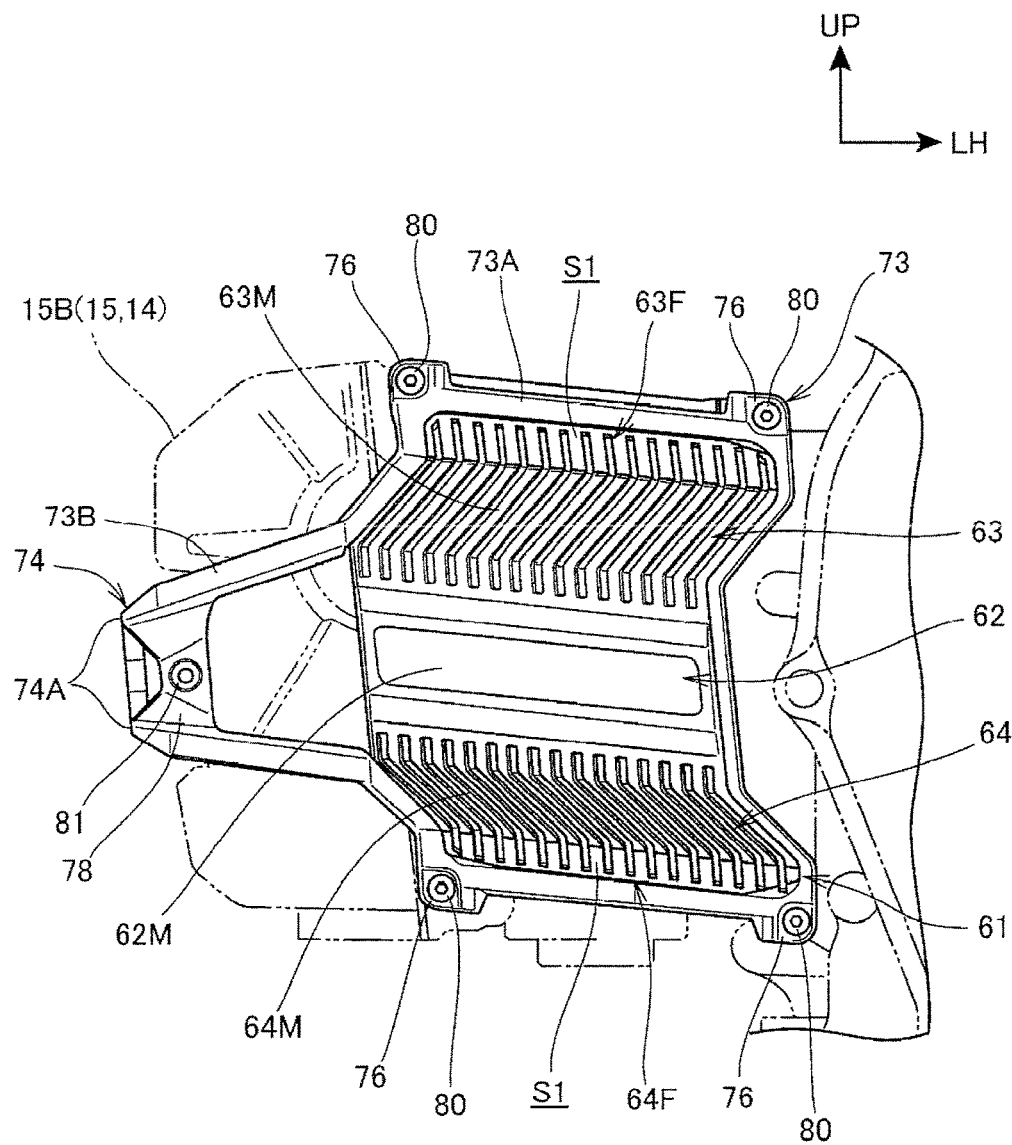
FIG. 7 is a view of the right side electrical component case as viewed from the front side together with a peripheral structure.
Figure 8:
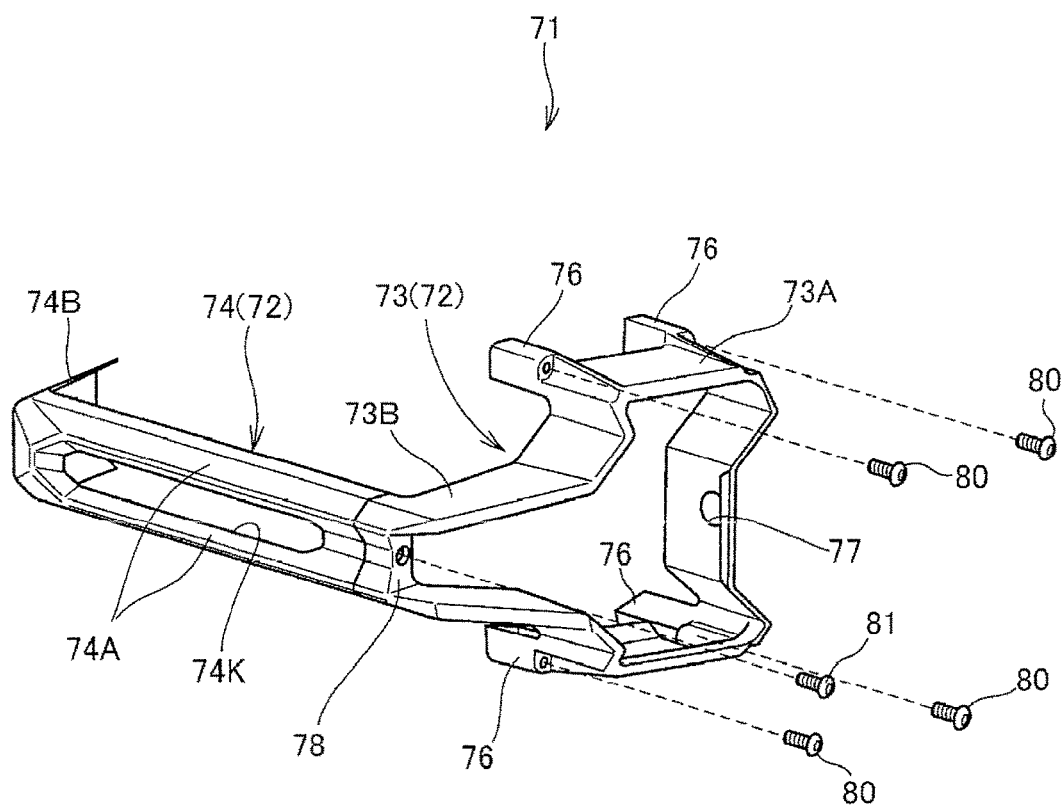
FIG. 8 is a perspective view of a right side rectification unit.

FIG. 5 is a view depicting the right side electrical component case 61 as viewed from the right side together with a peripheral structure, and FIG. 6 is a view depicting those as viewed from the right front side. Further, FIG. 7 is a view depicting those from the front side. It is to be noted that, in FIG. 7, the power unit 14 is indicated by alternate long and two short dashes lines for convenience of explanation. Further, FIG. 8 is a perspective view of the right side rectification unit 71.

As depicted in FIGS. 5 to 8, the rectification unit 71 includes a rectification unit main body 72 formed from a material having rigidity such as a metal material or a resin material. The rectification unit main body 72 is configured from a front frame 73 of a frame shape to which the electrical component case 61 is attached, and a rear frame 74 extending rearwardly from an outer side end portion in the vehicle widthwise direction of the front frame 73.

The front frame 73 is formed in a frame shape open in the forward and rearward direction of the vehicle body. More particularly, the front frame 73 has, on the inner side in the vehicle widthwise direction, an attachment frame 73A (FIG. 8) to which the electrical component case 61 is attached. Fastened portions 76 (FIG. 8) are provided integrally at positions corresponding to upper, lower, left and right corner portions of the attachment frame 73A, and a fastening member 80 (FIG. 8) is inserted from the front side in each of the fastened portions 76. The fastening members 80 inserted in the fastened portions 76 are individually fastened to the cylinder portion 15B of the engine 15 to fix the front frame 73 to the engine 15. In FIG. 8, a bridging frame 73B of a wing shape connects the attachment frame 73A and the rear frame 74 to each other. A hole portion 77 is provided in the attachment frame 73A such that a wiring line extending from the electrical component case 61 is threaded therein.

The electrical component case 61 is formed from a material having rigidity and thermal conductivity such as a metal material. As depicted in FIGS. 6 and 7, the electrical component case 61 integrally includes a case intermediate portion 62 configuring an intermediate member in the upward and downward direction and a pair of upper and lower inclined portions 63 and 64 connecting to upper and lower portions of the case intermediate portion 62, respectively. Electronic parts configuring the electrical components are accommodated at least in the case intermediate portion 62. It is to be noted that, in such a case that the electrical components are not fully accommodated in the case intermediate portion 62 or in a like case, part of the electrical components may be accommodated in the upper and lower inclined portions 63 and 64.

A face 62M of the case intermediate portion 62 exposed forwardly of the vehicle body is a face substantially vertical as viewed in a side elevational view of the vehicle body and is formed as an inclined face which is inclined rearwardly toward the outer side in the vehicle widthwise direction as viewed in a plan view of the vehicle body (for example, as viewed in a top plan view of the vehicle body). Consequently, the face 62M functions as a heat dissipation plate which contacts with the flow of air from the front side of the vehicle body and efficiently cools heat radiated from the electronic parts by the flow of air.

Further, the face 62M functions as a flow rectifying plate (hereinafter referred to as "first rectifying plate 62M") for guiding the flow of air from the front side of the vehicle body to the outer side in the vehicle widthwise direction. In other words, since the first rectifying plate 62M is directed toward the outer side in the vehicle widthwise direction of the cylinder portion 15B of the engine 15, the first rectifying plate 62M functions as a flow rectifying plate for guiding the flow of air from the front side of the first rectifying plate 62M to an outer side portion in the vehicle widthwise direction of the cylinder portion 15B.

As described above, since the outer side portion of the cylinder portion 15B in the vehicle widthwise direction overlaps with the front wheel 12 as viewed in a front elevational view (FIGS. 2 and 3), a cooling effect by flow of air from the front side of the front wheels 12 is less likely to be achieved. Meanwhile, since the electrical component case 61 is positioned on the inner side of the pair of left and right front wheels 12 as viewed in a front elevational view of the vehicle body as depicted in FIG. 2, flow of air passing between the left and right front wheels 12 flows toward the electrical component case 61. Consequently, the flow of air flowing between the left and right front wheels 12 can be guided to an outer side portion in the vehicle widthwise direction of the cylinder portion 15B, and the outer side portion in the vehicle widthwise direction of the cylinder portion 15B can be efficiently cooled.

As depicted in FIGS. 6 and 7, the upper side inclined portion 63 of the electrical component case 61 is inclined forwardly upwardly over the overall width of the electrical component case 61 while the lower side inclined portion 64 is inclined forwardly downwardly over the overall width of the electrical component case 61. Consequently, faces 63M and 64M of the upper and lower inclined portions 63 and 64 exposed forwardly of the vehicle body function as flow rectifying plates (hereinafter referred to as "second rectifying plates 63M and 64M") for guiding the flow of air from the front side of the vehicle body to the case intermediate portion 62. It is to be noted that the inclined portions 63 and 64 may be formed from plate members such as metal plates or may be box members which can accommodate electronic parts and so forth in the inside thereof.

The upper and lower faces 63M and 64M function also as heat dissipation plates for dissipating heat of the electrical components disposed in the electrical component case 61 as heat of the electrical components is transmitted thereto. Also the second rectifying plates 63M and 64M are each formed as an inclined face inclined rearwardly toward the outer side in the vehicle widthwise direction as viewed in a plan view of the vehicle body similarly to the first rectifying plate 62M. By the upper and lower second rectifying plates 63M and 64M, the heat dissipation area can be increased and the flow of air from the front side of the vehicle body can be collected efficiently to the case intermediate portion 62 (corresponding to the first rectifying plate 62M) in comparison with an alternative case in which only the case intermediate portion 62 is provided.

Further, on each of the second rectifying plates 63M and 64M, a plurality of recessed and projected portions directed to the case intermediate portion 62 are formed in a spaced relationship from each other in the vehicle widthwise direction. By the recessed and projected portions, the flow of air can be guided with a higher efficiency from the second rectifying plates 63M and 64M to the first rectifying plate 62M. Further, the heat dissipation effect can be improved as the heat dissipation area increases. Consequently, the first rectifying plate 62M functions as a flow rectifying plate and a heat dissipation plate directed toward the engine 15 (cylinder portion 15B), and the upper and lower second rectifying plates 63M and 64M function as both flow rectifying plates and heat dissipation plates directed to the electrical components.

As depicted in FIG. 7, the upper and lower second rectifying plates 63M and 64M extend to a position at which opening portions S1 open in the forward and rearward direction (hereinafter referred to as "front-rear opening portions S1") are formed between the second rectifying plates 63M and 64M and the attachment frame 73A of the front frame 73. Then, the upper and lower second rectifying plates 63M and 64M integrally include rectifying fins 63F and 64F extending in the forward and rearward direction of the vehicle body in the front-rear opening portions S1.

The upper and lower front-rear opening portions S1 open in the forward and rearward direction extend over the overall width of the electrical component case 61 such that the flow of air from the front side of the vehicle body flows rearwardly past upper and lower portions of the electrical component case 61. Further, the plurality of rectifying fins 63F and 64F are provided in a spaced relationship from each other in the vehicle widthwise direction in the upper and lower front-rear opening portions S1 such that the directions of the flow of air passing the front-rear opening portions S1 are adjusted to the forward and rearward direction of the vehicle body by the rectifying fins 63F and 64F. Accordingly, by the front-rear opening portions S1 and the rectifying fins 63F and 64F, the forward flow of air can be rectified and flows to upper and lower portions of the cylinder portion 15B positioned at the rear of the attachment frame 73A, and the cylinder portion 15B can be efficiently cooled.

In other words, the rectification unit 71 includes the upper and lower front-rear opening portions S1 open in the forward and rearward direction between the rectification unit 71 and the electrical component case 61 such that part of the flow of air from the front side of the vehicle body passes through the front-rear opening portions S1 and comes into contact with the cylinder portion 15B of the engine 15. In this manner, by the electrical component case 61 and the rectification unit 71, the flow of air from the front side of the vehicle body can be introduced to the cylinder portion 15B of the engine 15 and the electrical components to efficiently cool the cylinder portion 15B and the electrical components.

As depicted in FIG. 4, the front frame 73 of each rectification unit 71 supports the electrical component case 61 such that an opening portion 73K (FIG. 4) which is open in the upward and downward direction is formed between the front frame 73 and the front face of the cylinder portion 15B. By the opening portion 73K, it is possible to form an air passing space into which the flow of air is introduced or from which internal air is discharged between the cylinder portion 15B and the electrical component case 61. Consequently, the engine 15 and the electrical component case 61 can be positioned accurately in a positional relationship spaced from each other. Therefore, an expected cooling effect can be readily achieved, and heat transmission between the engine 15 and the electrical component case 61 can be efficiently suppressed.

Hereinafter, the rear frame 74 of the rectification unit 71 is described.

The rear frame 74 is a positioning unit positioned on the rear face of the engine 15 and integrally includes front-rear extending portions 74A and a bent portion 74B. The front-rear extending portions 74A extend rearwardly from an end portion on the outer side in the vehicle widthwise direction of the front frame 73. The bent portion 74B is curved to the inner side in the vehicle widthwise direction from a rear end of the front-rear extending portions 74A and is positioned on the rear face of the engine 15.

The front-rear extending portions 74A connect at a front end portion thereof to the rear of an end portion of an outer side in the vehicle widthwise direction of the front frame 73. A fastened portion 78 is formed at an end portion of the front frame 73 and has a through-hole in which a fastening member 81 (FIG. 8) is inserted. Another through-hole is formed at a front end portion of the rear frame 74 and connects to the through-hole of the fastened portion 78. Consequently, by threading the fastened portion 78 of the front frame 73 and a front end portion of the rear frame 74 from the front side with the fastening member 81 and fastening the fastening member 81 to the cylinder portion 15B of the engine 15, the front frame 73 and the rear frame 74 can be fastened together to the cylinder portion 15B. Since the common fastening member 81 is used, a reduction in the number of parts and a simplification of the mounting and dismounting works can be anticipated.

The bent portion 74B of the rear frame 74 positions the rectification unit 71 to the engine 15 by hooking the bent portion 74B on a rear face of the cylinder portion 15B of the engine 15. It is to be noted that not the hooking structure but a different positioning structure such as a fastening structure may be used to position the rectification unit 71 to the engine 15.

In the present configuration, since the rectification unit main body 72 is fastened to the front face of the cylinder portion 15B of the engine 15 and positioned on the rear face of the cylinder portion 15B, the rectification unit 71 and the cylinder portion 15B can be positioned with high accuracy.

The front-rear extending portions 74A of the rear frame 74 extend along the forward and rearward direction between a front end portion of the rear frame 74 and the bent portion 74B and are provided in an upwardly and downwardly spaced relationship from each other. The upper and lower front-rear extending portions 74A are formed in a projecting shape (also called rib shape) having a projected cross section projecting to an outer side in the vehicle widthwise direction and extending linearly in the forward and rearward direction of the vehicle body. Consequently, each of the front-rear extending portions 74A functions as a rectifier for adjusting the flow of air to the forward and rearward direction of the vehicle body. Thus, each front-rear extending portions 74A contributes to improvement in rectilinearly advancing performance of the saddle type vehicle 10 and functions as an engine guard which protects the engine 15.

Further, an opening portion 74K connecting to the cylinder portion 15B of the engine 15 is formed between the front-rear extending portions 74A of the projecting shape described above. Consequently, the flow of air is likely to be introduced to the cylinder portion 15B side through the opening portion 74K. By this construction, the cooling effect of the engine 15 can be readily improved.

Here, plug sockets 85 are attached to a face of the cylinder portion 15B on the outer side in the vehicle widthwise direction as depicted in FIG. 5 and so forth and are connected to an ignition plug disposed in the inside of the cylinder portion 15B. In the present configuration, the upper and lower front-rear extending portions 74A are disposed at a position at which they overlap with the plug sockets 85 as viewed in side elevation of the vehicle body. Plug cables (not depicted) connecting to the plug sockets 85 are laid out along the rear face of the front-rear extending portions 74A. Consequently, the front-rear extending portions 74A function also as protective members for protecting the plug sockets 85 and the plug cables.

Further, as depicted in FIG. 5, the upper and lower front-rear extending portions 74A are disposed at a position wherein they do not overlap with fastening portions existing around the plug sockets 85 and a cylinder head cover 86 as viewed in a side elevation view. Consequently, access to the various fastening portions and mounting and dismounting of the cylinder head cover 86 can be performed without removing the rectification unit 71 from the engine 15.

As described above, according to the present embodiment, the electrical component case 61 which accommodates electrical components therein is provided in front of the engine 15 and functions as a rectification member integrated with the electrical components for shunting and introducing the flow of air to the engine 15 and the electrical components. Therefore, the engine 15 and the electrical components can be cooled efficiency by cooling air. In addition, it is possible to efficiently utilize the space in front of the engine 15.

The electrical component case 61 has the flow rectifying plates (first rectifying plate 62M and second rectifying plates 63M and 64M) directed to the engine 15 and the electrical components. Therefore, the flow of air can be introduced precisely to the engine 15 and the electrical components by the flow rectifying plates.

Since the electrical component case 61 is provided inwardly of the pair of left and right front wheels 12, the engine 15 and the electrical components can be cooled efficiently utilizing the flow of air which is not disturbed by the front wheels 12.

The electrical component case 61 includes the rectification unit 71 which is formed as a separate member from the electrical components and functions as a different rectification member for introducing the flow of air to the engine 15. The rectification unit 71 integrally includes the front frame 73 (electrical component attachment portion) to which an electrical component is attached through the electrical component case 61 and the bent portion 74B which positions the rectification unit 71 to the engine 15. Further, since the opening portion 73K which forms an air passing space is provided between an electrical component (electrical component case 61) and the engine 15, it is easy to assure the positioning accuracy between the electrical component and the engine 15, and an expected cooling effect can be easily obtained. Further, heat transmission between the engine 15 and the electrical component can be effectively suppressed.

The front-rear extending portions 74A which function as rectifiers extending in the forward and rearward direction of the vehicle body are provided between the front frame 73 (electrical component attachment portion) to which an electrical component is attached and the rear frame 74 (positioning unit) positioned on the engine 15. Therefore, a flow air is adjusted to the forward and rearward direction of the vehicle body, and this is advantageous in an improvement in the rectilinearly advancing performance of the saddle type vehicle 10.

The front-rear extending portions 74A are formed in a projecting shape projecting to the outer side in the vehicle widthwise direction with respect to the engine 15. Therefore, the strength of the front-rear extending portions 74A can be enhanced efficiently, and therefore, the front-rear extending portions 74A can be used also as an engine guard.

The rectification unit 71 has the plurality of front-rear extending portions 74A of a projecting shape and has the opening portion 74K, which is directed to the engine 15, between the front-rear extending portions 74A. Therefore, the flow of air can be introduced to the engine 15 side through the opening portion 74K. In addition, this also makes it easy to enhance the cooling effect for the engine 15.

The engine 15 is a multi-cylinder engine including a plurality of cylinders spaced from each other in the forward and rearward direction of the vehicle body, and the front-rear extending portions 74A are provided forwardly and rearwardly across the engine 15. Therefore, the front-rear extending portions 74A can be provided long making use of the forward-rearward length of the engine 15 which is long in the forward and rearward direction. Accordingly, a rectification effect, an engine protection effect and an engine cooling effect by the front-rear extending portions 74A can be improved readily.

The rectification unit 71 includes the front-rear opening portions S1, which are open in the forward and rearward direction, between the rectification unit 71 and the electrical component case 61, and the flow of air passing through the front-rear opening portions S1 is contacted with the engine 15. Therefore, the cooling effect for the engine 15 can be improved further. In addition, since the electrical component case 61 includes the rectifying fins 63F and 64F extending in the forward and rearward direction of the vehicle body in the front-rear opening portions S1, the flow of air can be introduced with a higher degree of certainty to the engine 15 thereby to improve the cooling effect.

It is to be noted that the electrical component case 61 and the rectification unit 71 described above may be modified suitably without departing from the spirit and scope of the present invention. Further, while it is described that the electrical components accommodated in the electrical component case 61 are unique electrical components the hybrid vehicle has, the electrical components may be other electrical components which generate heat.

Now, a cooling structure for a battery for driving the vehicle body of the saddle type vehicle 10 is described.

Figure 10:
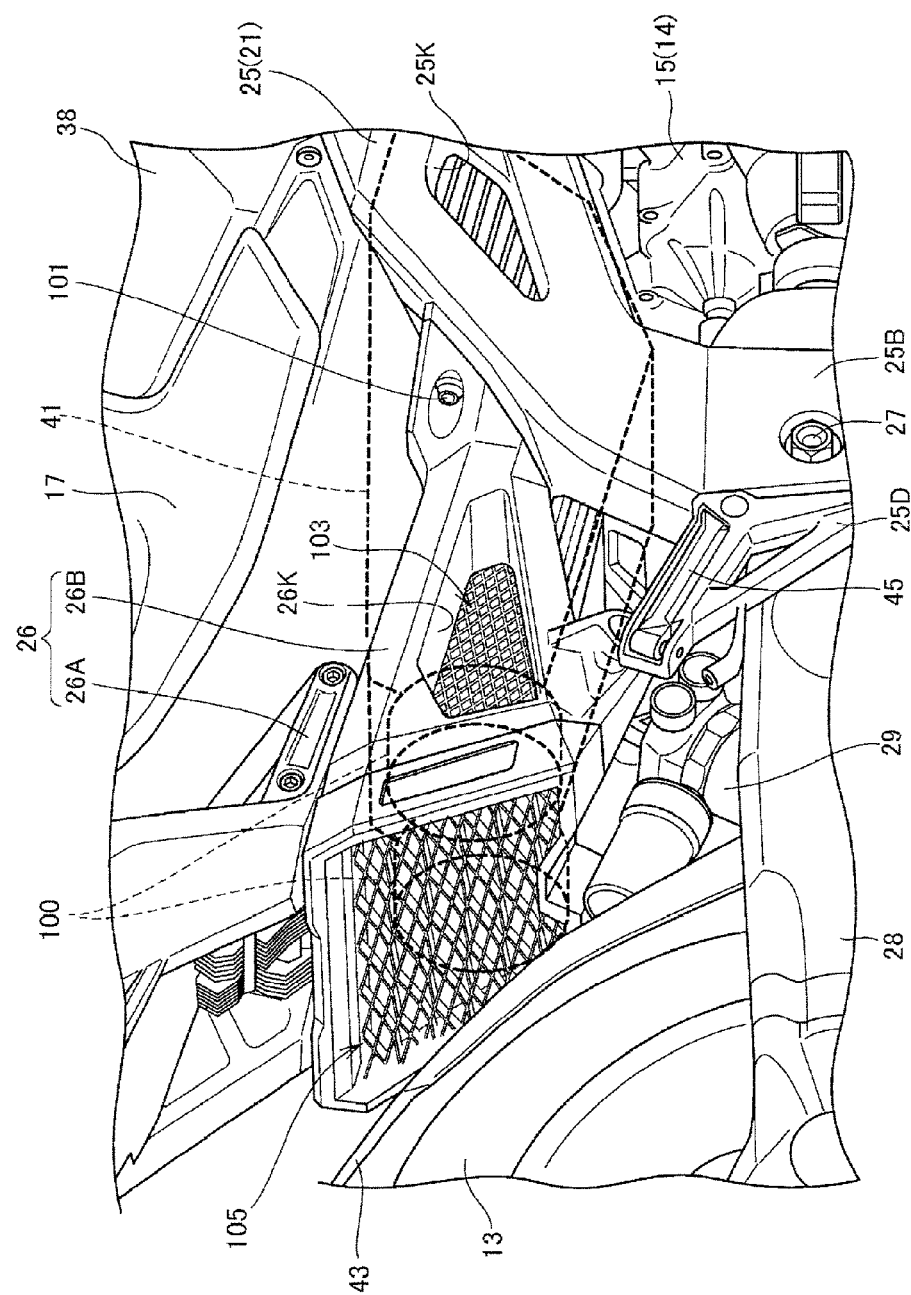
FIG. 10 is a view of the battery case as viewed from an oblique right rear side together with peripheral components.

FIG. 9 is a view of the battery case 41 as viewed from the right side together with peripheral components, and FIG. 10 is a view depicting those as viewed from the oblique right rear side.

The battery in the battery case 41 has a large capacity because it is a power supply for driving the power unit 14 and generates a relatively great amount of heat. Therefore, the saddle type vehicle 10 is configured such that a cooling fan 100 is provided at a rear end of the battery case 41 such that air forwardly of the cooling fan 100 is discharged rearwardly by the cooling fan 100 as depicted in FIGS. 9 and 10. Consequently, the battery case 41 is air-cooled to suppress a temperature rise of the battery in the battery case 41.

According to the cooling structure described above, since the battery case 41 is cooled utilizing air on the front side which is the upstream side with respect to the cooling fan 100, air before it is resisted by the cooling fan 100 can be used efficiently to cool the battery. Although strictly a flow speed drop is caused by an influence of the passing resistance through the cooling fan 100 also on the upstream side of the cooling fan 100, the flow speed dropping amount is small in comparison with that on the downstream side of the cooling fan 100. Thus, the amount of cooling air for cooling the battery is assured to be as greater as possible. Accordingly, the battery can be efficiently cooled.

Further, when the cooling fan 100 stops, the battery case 41 can be cooled utilizing the flow of air from the front side of the vehicle body. Also in this case, the flow of air on the front side which is the upstream side of the cooling fan 100 is contacted with the battery case 41 to cool the battery case 41. Therefore, the battery can be cooled efficiently utilizing the flow of air before it is resisted by the cooling fan 100. In the following, the components of the battery case 41 and the cooling fan 100 are described together with peripheral components.

The battery case 41 is disposed utilizing a dead space above the engine 15 below the seat 17 between the left and right main frame units 25 and the seat rail unit 26 as depicted in FIGS. 9 and 10. It is to be noted that the left and right main frame units 25 and the seat rail unit 26 are formed in a leftwardly and rightwardly symmetrical shape with reference to the center in the vehicle widthwise direction.

The seat rail unit 26 includes a first seat rail portion 26A which supports the seat 17 thereon, and a pair of left and right second seat rail portions 26B which connect the first seat rail portion 26A and the left and right main frame units 25 to each other, respectively. Each of the second seat rail portions 26B is formed as a frame of a substantially triangular shape which indicates increase in upward and downward length toward the rear, and serves as a side cover which covers part of a side portion of the vehicle body.

Each of the second seat rail portions 26B is fixed to the main frame unit 25 by a fastening member 101 (in the present configuration, a bolt) in FIG. 9 and the shaft part 42 (in the present configuration, a long axis bolt) which supports an upper portion of the rear shock absorber 29. In other words, the second seat rail portions 26B and the upper portion of the rear shock absorber 29 are fixed to the main frame unit 25 by fastening together. Consequently, the number of parts is reduced.

As depicted in FIG. 9, a rear portion of the battery case 41 and the cooling fan 100 are disposed in an overlapping relationship with each other as viewed in side elevation between the left and right second seat rail portions 26B. A front portion of the battery case 41 is disposed between the pair of left and right main frame units 25. Consequently, part of the vehicle body frame 21 (second seat rail portions 26B and main frame units 25) can be used also as a cover member for covering the battery case 41 and the cooling fan 100. Accordingly, the battery case 41 and the cooling fan 100 can be protected such that they cannot be accessed readily from the outside.

On each of the second seat rail portions 26B, an opening portion 26K (FIG. 9) is formed at a position at which the second seat rail portion 26B overlaps with the battery case 41 as viewed in a side elevation view. This opening portion 26K functions as a lightening hole for lightening the second seat rail portion 26B and functions also as an external air inlet for taking in external air toward an outer surface of the battery case 41 in the proximity of the cooling fan 100.

By taking in external air from the opening portion 26K by the cooling fan 100, the external air can be positively contacted with the battery case 41.

The opening portion 26K is covered with a porous structure member 103 through which air can pass. The porous structure member 103 is formed as a lattice body having a large number of through-holes directed in a rearwardly inward direction and is formed, for example, as a molded part of a resin. This porous structure member 103 directs external air passing through the opening portion 26K toward the rear inner side. Consequently, external air passing through the opening portion 26K can flow with a high degree of efficiency toward the battery case 41 and the cooling fan 100.

The opening portion 26K is covered with a porous structure member 103 through which air can pass. The porous structure member 103 is formed as a lattice body having a large number of through-holes directed in a rearwardly inward direction and is formed, for example, as a molded part of a resin. This porous structure member 103 directs external air passing through the opening portion 26K toward the rear inner side. Consequently, external air passing through the opening portion 26K can be flowed with a high degree of efficiency toward the battery case 41 and the cooling fan 100.

It is to be noted that the porous structure member 103 is not limited to a lattice body directed in a rearwardly inward direction but may be a net-like body of a simple porous structure. Further, the second seat rail portions 26B which cover the outer sides of the battery case 41 in the vehicle widthwise direction are parts having rigidity, and the battery case 41 may be supported on the second seat rail portions 26B.

Also on the main frame unit 25, an opening portion 25K (FIG. 9) is formed at a position at which it overlaps with the battery case 41 as viewed in side elevation. The opening portion 25K is provided in a region overlapping with a front portion of the battery case 41 and functions as a lightening hole for lightening the main frame unit 25 and also as an external air inlet for taking in external air toward the outer surface of a front portion of the battery case 41. Consequently, external air can be contacted efficiently with the outer surface of the battery case 41 on the inner side of the main frame unit 25.

As depicted in FIG. 10, a porous structure member 105 is disposed in the rear of the cooling fan 100 and is attached in such a manner so as to cover a region between rear ends of the left and right second seat rail portions 26B. The porous structure member 105 is formed from a member which does not disturb the discharge of air by the cooling fan 100 and besides restricts access to the cooling fan 100 from the outside. In the present configuration, a lattice body having a porous structure having porosities penetrating in the forward and rearward direction is used.

As depicted in FIGS. 9 and 10, in the present configuration, at least a rear end of the cooling fan 100 is disposed in the rear of the occupants' steps (main steps 44 (FIG. 1) and pillion steps 45 (FIGS. 1 and 10)) in front of the rear fender 43 which covers the rear wheel 13. Consequently, the air outlet of the cooling fan 100 (corresponding to a rear end portion of the cooling fan 100 or the porous structure member 105 at the rear of the cooling fan 100) is positioned in the rear of the occupants' steps 44 and 45. Therefore, air warmed by heat of the battery can be avoided from contacting with the feet of the occupants. Further, since the air outlet of the cooling fan 100 is directed toward the rear fender 43 as depicted in FIG. 10, air warmed by heat of the battery can be avoided from contacting with the rear wheel 13, and consequently, a thermal influence on the rear wheel 13 can be suppressed.

Figure 11A:
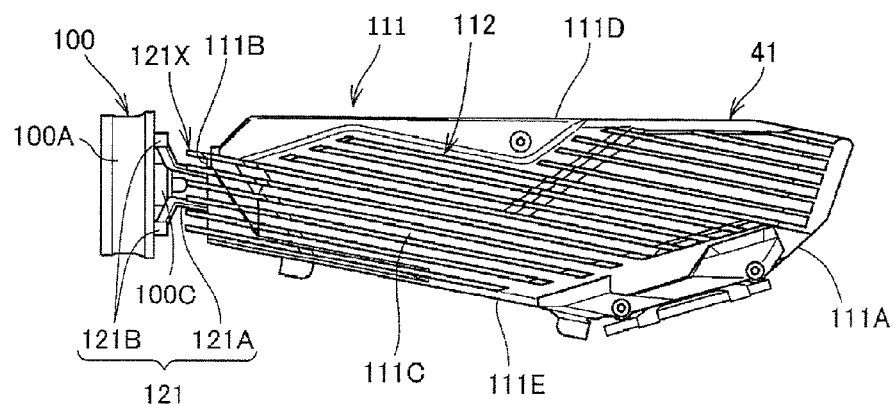
Figure 11B:
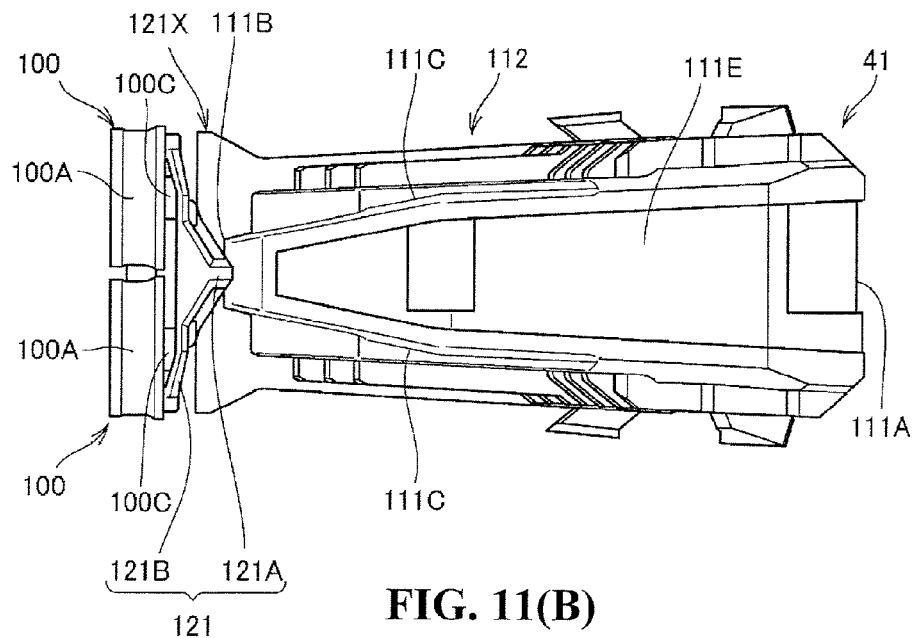
Figure 12:
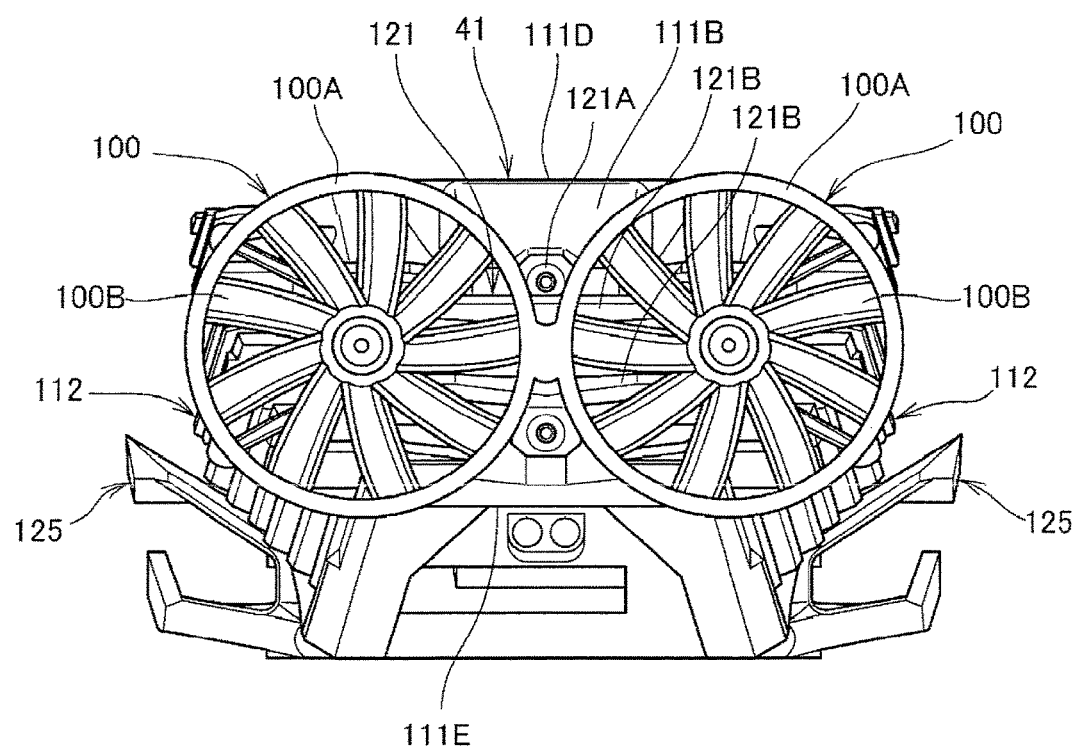
FIG. 12 is a rear elevational view of the battery case and cooling fans.

FIGS. 11(A) and 11(B) are views depicting the battery case 41 and the cooling fan 100. In particular, FIG. 11(A) is a side elevational view, and FIG. 11(B) is a top plan view. Further, FIG. 12 is a rear elevational view.

As depicted in FIGS. 11(A) and 11(B), the battery case 41 integrally includes a case main body 111 in which a battery is accommodated, and a plurality of fins 112 provided on the case main body 111.

The case main body 111 is formed in a box shape of a parallelepiped and is structured such that it does not allow for the invasion of rain water and so forth. The case main body 111 is configured from a front plate 111A, a rear plate 111B, a pair of left and right side plates 111C, a top plate 111D and a bottom plate 111E which cover the front, rear, left, right, upper and lower sides of the case main body 111. The case main body 111 is formed in a flattened shape having a vertical length shorter than a length in the forward and rearward direction and in an elongated shape having a leftward and rightward length shorter than a length in the forward and rearward direction. Consequently, the case main body 111 can be disposed making use of a space which appears above the engine 15 below the seat 17 between the left and right main frame units 25 and seat rail unit 26. By this construction, the space located above the engine 15 below the seat 17 and overlapping with the engine 15 and the seat 17 in the upward and downward direction of the vehicle body can be utilized effectively to dispose the battery case 41.

As depicted in FIG. 11(B), each of the left and right side plates 111C of the case main body 111 is formed as an inclined side plate inclined to the inner side in the vehicle widthwise direction toward the rear, and the rear plate 111B which covers a space between rear ends of the left and right side plates 111C has a width significantly smaller than that of the front plate 111A. Consequently, the front side of the cooling fan 100 (upstream side of the cooling fan 100) is not blocked by the case main body 111, and it becomes easier for the cooling fan 100 to take in air. Consequently, the air blow amount of the cooling fan 100 can be increased efficiently.

The cooling fan 100 is formed as an axial flow fan wherein rotary vanes 100B are provided in a tubular housing 100A and a small-sized motor 100C is provided in front of the rotary vanes 100B. Actually, a plurality of (two in the present configuration) cooling fans 100 are disposed in a spaced relationship from each other in the leftward and rightward direction. Consequently, while the vertical space necessary for disposition of the cooling fans 100 is suppressed, the air blow amount is increased.

The fins 112 are formed from a plate member having thermal conductivity such as a metal material and are provided on an outer surface of the case main body 111 to efficiently increase the outer surface area of the battery case 41. Consequently, the heat dissipation area for heat transmitted from the battery to the battery case 41 can be efficiently increased to enhance the cooling effect.

The plurality of fins 112 are provided integrally on the pair of left and right side plates 111C and are directed toward the cooling fan 100. More particularly, the fins 112 are inclined fins each in the form of a plate extending linearly in a rearwardly upward direction toward the inlet of the cooling fan 100 and are provided in parallel to each other over the substantially entire region of the side plates 111C. By the fins 112, the contact area with air can be assured efficiently and the cooling effect can be effectively enhanced without disturbing a flow of air to the cooling fans 100. It is to be noted that further fins of the type described may be provided in addition to those on the side plates 111C of the battery case 41.

As depicted in FIG. 11(B), some of the plurality of fins 112 which neighbor most with the cooling fan 100 (those fins which extend to the rear plate 111B of the battery case 41 and are positioned up to the sixth fin from the bottom in FIG. 11(A)) are formed in a shape that a rear end portion 121X expands in a vehicle-widthwise direction. Consequently, air can be rectified to a location just before the cooling fan 100, and both an increase of the air blow amount and an increase of the heat exchanging area are achieved and it becomes easy to further improve the cooling effect of the battery.

Each of the cooling fans 100 is attached to a rear face of the battery case 41 (rear plate 111B) through a stay 121.

The stay 121 is fixed to the center in the vehicle widthwise direction of the rear face of the battery case 41 and disposed in parallel to the fins 112 of the battery case 41. More particularly, the stay 121 has a base end portion 121A fixed to the rear plate 111B of the battery case 41 and a plurality of (in the present configuration, two) plate-like stays 121B attached in an upwardly and downwardly spaced relationship from each other to the base end portion 121A. The stay 121 supports the cooling fan 100 on the plate-like stays 121B.

The base end portion 121A is a member of a width reduced from that of the rear plate 111B and does not disturb a flow of external air advancing toward the cooling fan 100 around the battery case 41. Further, each plate-like stay 121B has a form of a plate extending to the outer side in the vehicle widthwise direction from the base end portion 121A, and is disposed in parallel to the fins 112 as viewed in a side elevation and overlaps with some of the fins 112 as viewed in the side elevation. Consequently, the stay 121 does not disturb a flow of external air advancing toward the cooling fan 100 along the fins 112, and a rectification effect similar to that anticipated by the fins 112 can be anticipated.

As depicted in FIG. 12, the cooling fans 100 are disposed adjacent each other in the vehicle widthwise direction and overlap with a rear face of the battery case 41 and a rear face of the fins 112 as viewed in a rear elevational view. More particularly, the housing 100A and the rotary vanes 100B of the cooling fan 100 remain within a range of a region surrounding the rear face of the battery case 41 and the rear face of the fins 112. Consequently, cooling air taken in to the cooling fan 100 can be contacted substantially wholly with the battery case 41 and the fins 112, and efficient cooling can be anticipated thereby.

As depicted in FIG. 12, the battery case 41 has pawl portions 125 engaged with the left and right second seat rail portions 26B which cover the outer sides in the vehicle widthwise direction of the battery case 41. The battery case 41 can be positioned with respect to the second seat rail portions 26B by the pawl portions 125. Since the second seat rail portions 26B are frame parts having rigidity, displacement of the battery case 41 can be suppressed effectively making use of the rigidity of the second seat rail portions 26B.

As described above, according to the present embodiment, the battery case 41 for accommodating a battery therein is provided in the space located above the engine 15 configuring part of the power unit 14 below the seat 17 (occupants' seat) and overlapping with the engine 15 and the seat 17 in the upward and downward direction of the vehicle body. Further, the cooling fan 100 for discharging air toward the rear is provided at a rear end of the battery case 41. Therefore, the battery can be cooled efficiently making use of external air (including the flow of air from the front side of the vehicle body) before it is acted upon by resistance of the cooling fan 100. Accordingly, the battery case 41 can be disposed efficiently utilizing the space defined by the power unit 14 and the seat 17, and the battery can be cooled efficiently by a simple configuration in comparison with a conventional configuration wherein an introduction path for external air is provided and a cooling fan is provided in the introduction path.

Since the battery case 41 has the fins 112 on the outer surface thereof, the outer surface area increases, and therefore, the cooling effect for the battery can be greatly enhanced. In addition, since the fins 112 are directed to the cooling fan 100, the heat dissipation area can be increased without disturbing a flow of air to the cooling fan 100, and the cooling effect for the battery can be further enhanced.

Since the stay 121 for attaching the cooling fan 100 to the battery case 41 is provided such that the stay 121 extends in parallel to the fins 112, it does not disturb a flow of external air advancing toward the cooling fan 100 along the fins 112. Further, since the cooling fan 100 and the battery case 41 can be disposed closely to each other, the disposition space for the cooling fan 100 and the battery case 41 can be reduced. In addition, the length of the wiring line path interconnecting the cooling fan 100 and the battery case 41 can be easily reduced.

Since the cooling fan 100 is fixed to the center in the vehicle widthwise direction of the rear face of the battery case 41 and the rotary vanes 100B of the cooling fan 100 overlap with the rear face of the battery case 41 as viewed in rear elevation, cooling air taken into the cooling fan 100 can be contacted efficiently with the outer surface of the battery case 41. Consequently, the cooling effect can be easily raised.

Since the second seat rail portions 26B configuring part of the seat rail unit 26 serve also as a cover member for covering the outer surface of the battery case 41 and also has the external air inlet (opening portion 26K) for taking in external air toward the outer surface of the battery case 41, external air taken in by the cooling fan 100 can be contacted positively with the battery case 41. Consequently, the cooling effect can be readily enhanced.

The engine 15 is a multi-cylinder engine including a plurality of cylinders spaced from each other in the forward and rearward direction of the vehicle body and the battery case 41 is disposed above the engine 15. Therefore, the space above the engine 15, elongated in the forward and rearward direction of the vehicle body, can be utilized effectively, which is advantageous in compactification of the vehicle. Further, since the battery having a comparatively high weight is provided above the engine 15, the position of the center of gravity of the vehicle can be set to a suitably high position.

Since the air outlet of the cooling fan 100 is positioned at the rear of the occupants' steps (main steps 44 and pillion steps 45) on which the passengers place their feet, air warmed by heat of the battery can be avoided from contacting with the feet of the passengers.

Furthermore, since the air outlet of the cooling fan 100 is directed to the rear fender 43 which covers the rear wheel 13, air warmed by heat of the battery can be avoided from contacting with the rear wheel 13, and an influence of heat on the rear wheel 13 can be suppressed.

It is to be noted that the battery case 41 and the cooling fan 100 described above can be modified suitably without departing from the spirit and scope of the present invention.

Further, the engine 15 is not limited to a horizontal multi-cylinder engine, but engines including a plurality of cylinders spaced from each other in the forward and rearward direction of the vehicle body such as a V-type two-cylinder engine or a V-type four-cylinder engine can be widely applied.

While it is described in the foregoing description of the embodiment that the present invention is applied to the saddle type vehicle 10 depicted in FIG. 1, the application of the present invention is not limited to this, but the present invention may be applied to various saddle type vehicles such as a motorcycle, a three-wheeled vehicle or a four-wheeled vehicle such as an ATV (all-terrain vehicle).

Further, while it is described in the foregoing description of the embodiment that the present invention is applied to a hybrid vehicle having the engine 15 and the motor 16 as driving sources, the application of the present invention is not limited to this, but the present invention can be applied to a vehicle which includes only the engine 15 as a driving source.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle vehicle comprising:
an engine;
an electrical component;
the electrical component being provided in front of the engine;
a rectification member being provided integrally with the electrical component to shunt and guide a flow of air to the engine and the electrical component;
a different rectification member provided separately from the electrical component and configured to guide the flow air to the engine; and
the different rectification member integrally including an electrical component attachment portion to which the electrical component is attached and a positioning unit positioned on the engine, and being disposed such that an air passing space is provided between the electrical component and the engine.

2. The saddle vehicle according to claim 1, wherein the rectification member includes rectifying plates directed to the engine and the electrical component.

3. The saddle vehicle according to claim 2, and further comprising:
a pair of left and right front wheels;

the rectification member being provided at the inner side of the pair of left and right front wheels as viewed in a front elevation view.

4. The saddle vehicle according to claim 1, and further comprising:
a pair of left and right front wheels;
the rectification member being provided at the inner side of the pair of left and right front wheels as viewed in a front elevation view of a vehicle body.

5. The saddle vehicle according to claim 1, wherein the positioning unit has a rectifier extending in a forward and rearward direction of the vehicle body between the positioning unit and the electrical component attachment portion.

6. The saddle vehicle according to claim 5, wherein the rectifier is formed in a projecting shape projecting to the outer side in a vehicle widthwise direction with respect to the engine.

7. The saddle vehicle according to claim 6, wherein a plurality of rectifiers are provided and an opening portion directed to the engine is provided between the plurality of rectifiers.

8. The saddle vehicle according to claim 7, wherein:
the engine is a multi-cylinder engine including a plurality of cylinders spaced from each other in the forward and rearward direction of the vehicle body, and
the rectifier is provided over the front to the rear of the engine.

9. The saddle vehicle according to claim 6, wherein:
the engine is a multi-cylinder engine including a plurality of cylinders spaced from each other in the forward and rearward direction of the vehicle body, and
the rectifier is provided over the front to the rear of the engine.

10. The saddle vehicle according to claim 5, wherein:
the engine is a multi-cylinder engine including a plurality of cylinders spaced from each other in the forward and rearward direction of the vehicle body, and
the rectifier is provided over the front to the rear of the engine.

11. The saddle vehicle according to claim 5, wherein the different rectification member includes a front-rear opening portion open in the forward and rearward direction between the different rectification member and the rectification member such that the flow of air passing the front-rear opening portion is contacted with the engine.

12. The saddle vehicle according to claim 1, wherein the different rectification member includes a front-rear opening portion open in the forward and rearward direction between the different rectification member and the rectification member such that the flow of air passing the front-rear opening portion is contacted with the engine.

13. A saddle vehicle comprising:
an engine;
an electrical component;
the electrical component being provided in front of the engine;
a first rectification member being provided integrally with the electrical component to shunt and guide a flow of air to the engine and the electrical component; and
a second rectification member includes a front-rear opening portion open in the forward and rearward direction between the second rectification member and the first rectification member such that the flow of air passing the front-rear opening portion is contacted with the engine.

14. The saddle vehicle according to claim 13, wherein the first rectification member includes rectifying plates directed to the engine and the electrical component.

15. The saddle vehicle according to claim 13, and further comprising:
a pair of left and right front wheels;
the first rectification member being provided at the inner side of the pair of left and right front wheels as viewed in a front elevation view of a vehicle body.

16. The saddle vehicle according to claim 13, wherein:
said second rectification member is provided separately from the electrical component and configured to guide the flow air to the engine; and
the second rectification member integrally includes an electrical component attachment portion to which the electrical component is attached and a positioning unit positioned on the engine, and being disposed such that an air passing space is provided between the electrical component and the engine.

17. The saddle vehicle according to claim 16, wherein the positioning unit has a rectifier extending in a forward and rearward direction of the vehicle body between the positioning unit and the electrical component attachment portion.

* * * * *